Jan. 19, 1971 W. F. PLUME 3,555,927
TORSIONAL VIBRATION DAMPER

Filed Feb. 14, 1969 3 Sheets-Sheet 1

INVENTOR
WILLIAM F. PLUME

BY  J. W. Anderson
    C. E. Tripp

ATTORNEYS

United States Patent Office 3,555,927
Patented Jan. 19, 1971

3,555,927
TORSIONAL VIBRATION DAMPER
William F. Plume, Marlton, N.J., assignor to FMC Corporation, San Jose, Calif., a corporation of Delaware
Filed Feb. 14, 1969, Ser. No. 799,174
Int. Cl. F16f 15/10
U.S. Cl. 74—574          4 Claims

ABSTRACT OF THE DISCLOSURE

A torsional vibration damper for a rotatable shaft or shaft-like member of the type used in applications where the drive for the shaft-like member is located at one end and the other end is free (not connected to other shafts or masses). The shaft-like member may be an extruder screw. The shaft-like member has a concentric counter bore extending inwardly from one end thereof. The damper comprises a pair of elongated elements disposed in the bore on opposite sides of the axis of rotation of the shaft-like member and yieldable biasing means disposed between the elements for urging the latter part and into frictional engagement with the internal surfaces of the bore.

BACKGROUND OF THE INVENTION

The present invention relates to vibration dampers and particularly to torsional vibration dampers for absorbing torsional oscillations of rotary shafts of the type wherein the shaft drive is located at one end of the shaft-like member and the other end is free. This invention has particular utility, for example, in connection with extruder screws. However, it will be readily appreciated by those skilled in the art that the apparatus of the instant invention may also be used for alleviating torsional oscillations in other types of rotary shafts or shaft-like members.

DESCRIPTION OF THE PRIOR ART

Torsional vibrations can constitute a substantial problem in machinery made up of masses and elastic shafts in various combinations, if a pulsating force is applied in some part of the system at a frequency equal to or near one of the natural torsional frequencies of the system. Torsional vibrations may increase the instantaneous torque on a shaft to several times the calculated torque requirements of the operation. Various torsional vibration dampers are known in the art, however, the majority of these prior art devices have been extremely sophisticated and costly and/or have been designed to be integrated into a highly specific apparatus and therefore are not suitable for universal application.

SUMMARY OF THE INVENTION

The present invention provides a simplified torsional vibration damper capable of practically universal application. The damper is used in conjunction with a rotatable shaft-like member having a longitudinal central cylindrical bore therein and comprises a pair of elongated elements disposed in the bore. Each of the elements has an outer arcuate surface configured to conform to the inner surface of the bore. Further, each of the elements has a central surface. The elements are located with the outer surfaces facing the inner surface of the bore and with the central surfaces disposed in spaced, facing, opposed relationship. A yieldable biasing means is disposed between the central surfaces for urging the elements away from one another and thereby urge the outer surfaces of the elements into engagement with the inner surface of the bore.

DESCRIPTION OF THE PREFERRED EMBODIMENT

Torsional vibration can be an extremely serious problem in plastic extruders. Gear failures have occurred because of torsional vibrations excited by the small pulse due to tooth mesh, the pulses from the driving member or possibly by the "stick-slip" type of operation often encountered in plastic extruders caused by the manner in which the plastic passes through the die. Thus, the instant invention is described in connection with a plastic extruder wherein the torsional vibration damper has a great utility.

Figure 1:
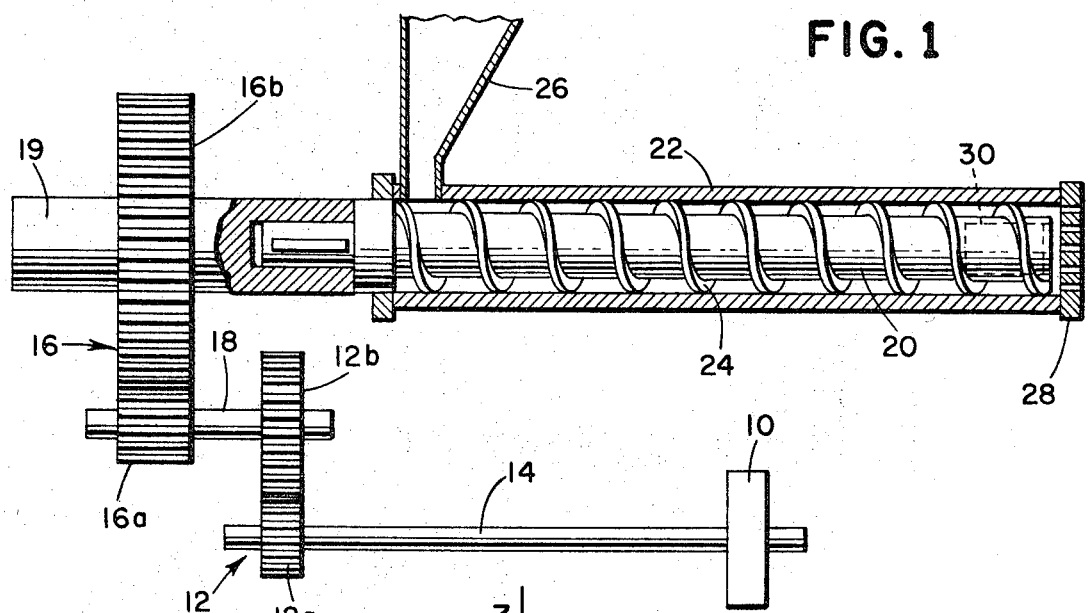
FIG. 1 is a schematic illustration of a plastic extruder or the like shown partially in cross-section and including an extruder screw provided with a torsional vibration damper constructed in accordance with the instant invention.

The extruder drive system illustrated in FIG. 1 is typical of conventional extruder drive systems. A driving rotor such as a motor or magnetic drive 10 is connected to the pinion gear 12a, of a speed reducer 12 through a high speed shaft 14. Pinion gear 12a of reducer 12 is meshed with a high speed gear 12b which in turn drives a low speed pinion 16a through an intermediate shaft 18. Pinon 16a is meshed with a low speed gear 16b mounted on a low speed shaft 19. Thus, pinion 16a and low speed gear 16b present a speed reducer 16.

An extruder screw 20 is connected to shaft 19 and is driven thereby within an extruder barrel 22. Screw 20 is a nearly solid steel shaft provided with a helical ridge 24 which tends to feed material axially of barrel 22. Raw material in the form of powder or granules of plastic is fed through hopper 26 into barrel 22 and is moved along the latter by ridge 24.

Heating elements (not shown) are provided to raise the temperature of the plastic to form a progressively more liquid viscous material in barrel 22. At the end of screw 20 remote from shaft 19, the plastic mixture may have reached a temperature of several hundred degrees Fahrenheit, and pressures of up to 10,000 lbs. per square inch may be exerted on the material. Thus, the viscous plastic is forced through a die 28 to produce a desired shape.

Figure 4A:
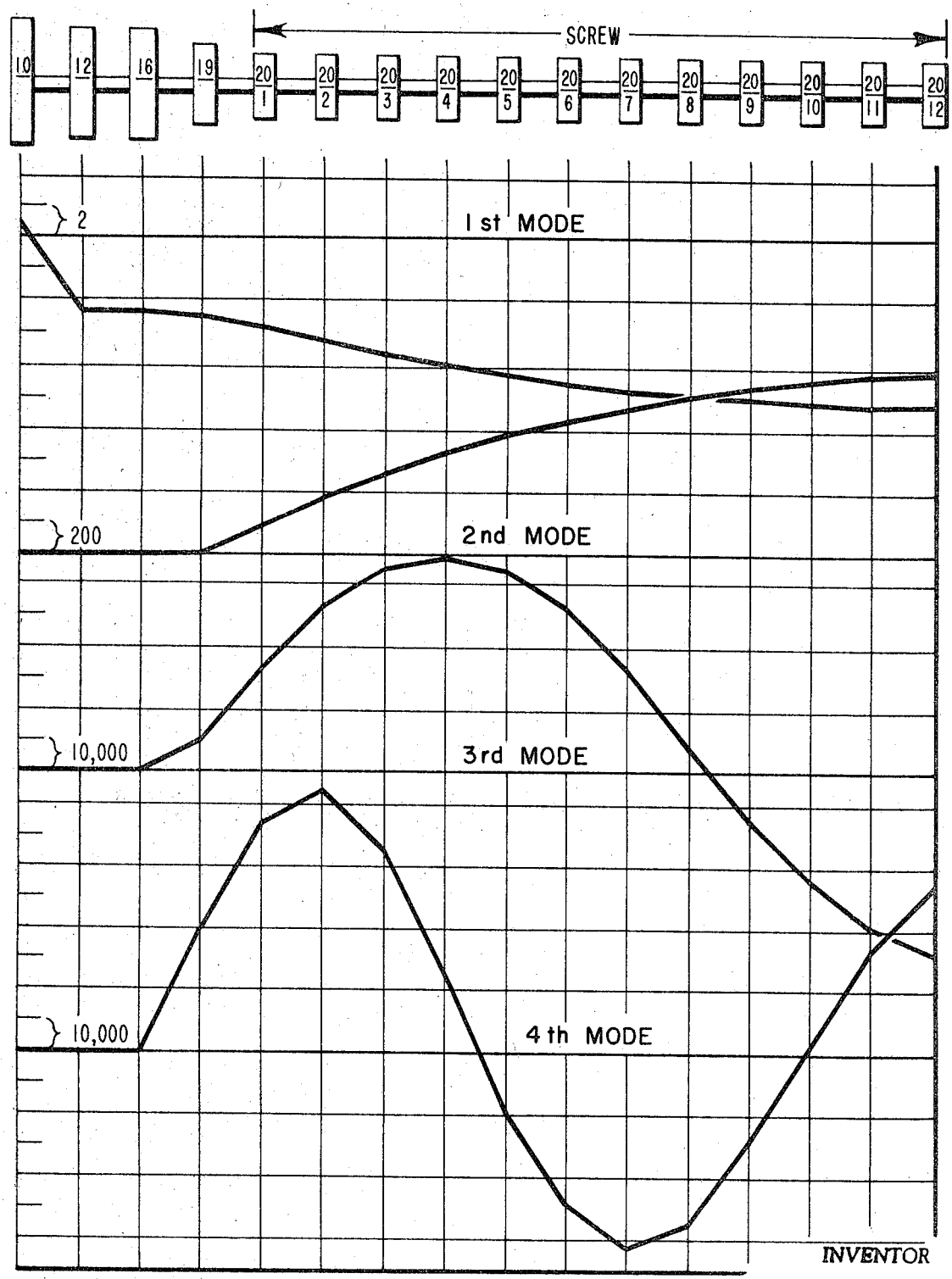
FIGS. 4A and 4B are graphical illustrations of the manner in which an undampened screw vibrates during several modes of operation.
Figure 4B:
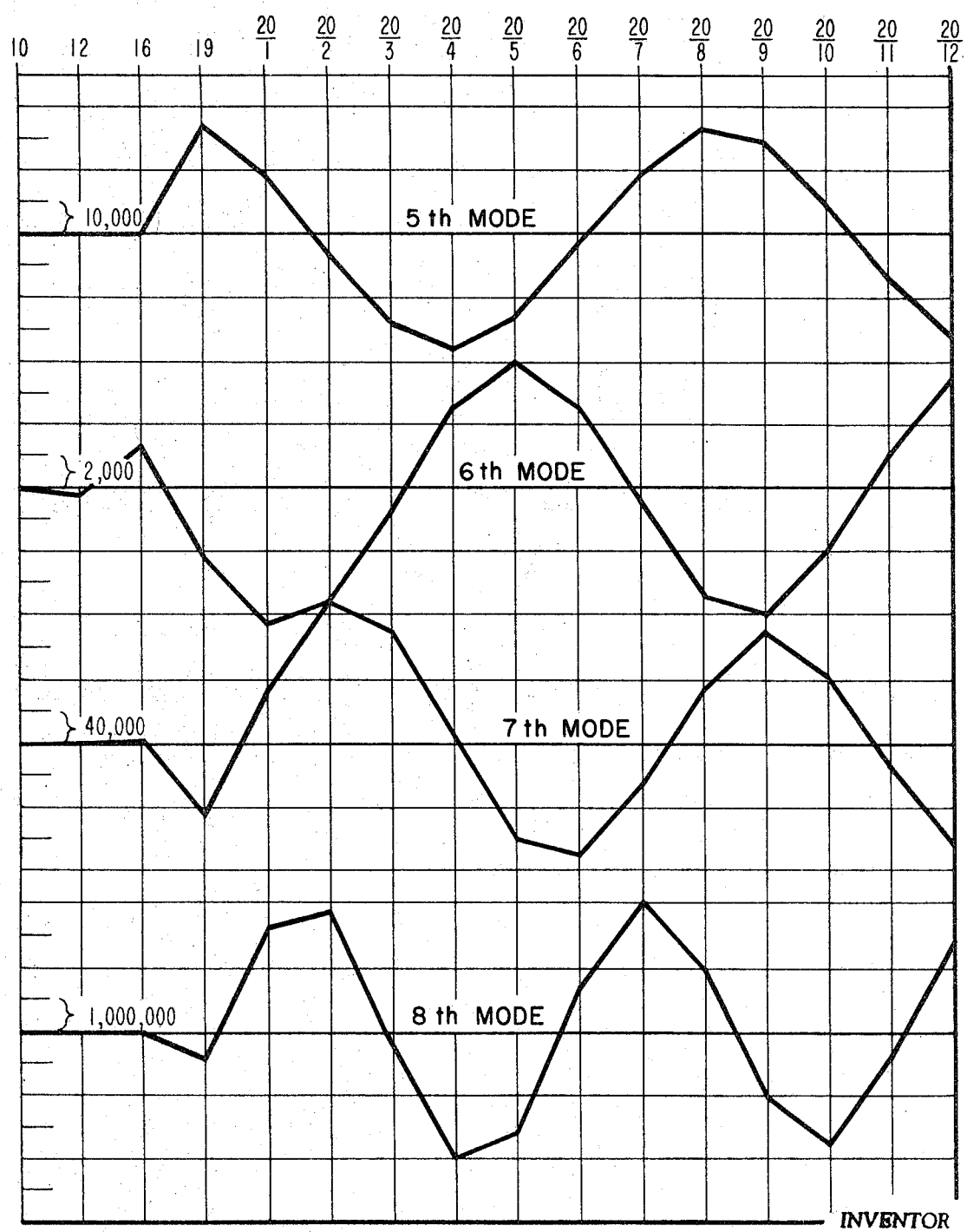

The rotating elements of the extruder screw drive mechanism comprise a system of masses and torsional springs and are therefore subject to torsional vibration if an exciting torque is applied at any point. FIGS. 4A and 4B include an equivalent system of masses and springs in which the elements actually operating at different speeds are converted to equivalent elements at one speed. This type of conversion is desirable in order to properly analyze the system.

In FIGS. 4A and 4B, mass 10 is the driver rotor, mass 12 is the equivalent sum of pinion 12a and gear 12b, mass 16 is the equivalent sum of pinion 16a and gear 16b, and mass 19 is the low speed shaft.

A system of this type may have several modes of operation, each mode having its own frequency. The first mode has one nodal point, with all the masses to the left of the mode vibrating in a direction oppoiste to all the masses to the right. The extruder screw in one particular example may have a diameter of 8 inchs and a length of 18 feet. For convenience in analysis, the screw may be considered to be broken up into 12 equivalent masses as illustrated in FIGS. 4A and 4B. (These equivalent masses are labeled 20/1–20/12.) The second mode will have two nodal points, etc.

FIGS. 4A and 4B show plots of torsional vibrations of the first 8 modes of a particular system. The plot represents angular displacement of each equivalent mass. It is to be noted that the screw section has very high amplitudes compared to the rotor and the gear masses.

Ordinarily, an extruder drive would be considered to be a smooth drive, with a steady motor or magnetic drive torque input and a smooth, viscous load at the extruder screw. However, it has been found that certain extrudable plastic mixtures contain materials which set up a "stick-slip" action at the extruder screw. In a particular torsional vibration analysis it was found that a cyclic torque applied at the end of the extruder screw could set up amplitude of vibration several times as great in the system as the same cyclic torque applied at the drive. Table I shows that a cyclic torque equal to 229% of transmitted torque on the high speed shaft in the first mode and 242% on the intermediate speed shaft in the sixth mode has been experienced in extruder drives.

TABLE I.—EXCITING TORQUE 1% OF MEAN TORQUE APPLIED AT END OF SCREW

| Mode | Natural frequency, cycles per second | Cyclic torque at pinion shafts, percent of mean torque | |
|---|---|---|---|
| | | High speed shaft | Intermediate speed shaft |
| First | 91 | 229 | 47.6 |
| Second | 130 | 128 | 98.0 |
| Third | 441 | 2.44 | 51.8 |
| Fourth | 705 | 1.66 | 93.2 |
| Fifth | 870 | 2.50 | 21.6 |
| Sixth | 963 | 2.29 | 24.2 |
| Seventh | 1,051 | 0.775 | 98.0 |
| Eighth | 1,307 | 0.0327 | 6.40 |

A torsional vibration damper which embodies the concept and principles of the instant invention is capable of preventing excessive loading of gears and other components due to torsional vibration in an extruder screw system. In particular, it is preferable to install the damper in the end of the screw 20 remote from shaft 19. The large vibrational amplitudes at this location cause a large energy input due to a small applied cyclic torque and therefore this end is an effective location for a damping device.

In practicing the concepts and principles of the instant invention, the shaft 20 of the extruder is provided with a concentric counter bore 30 extending inwardly from the end of shaft 20 remote from shaft 19. The damper 32 is then installed in bore 30.

Figure 3:
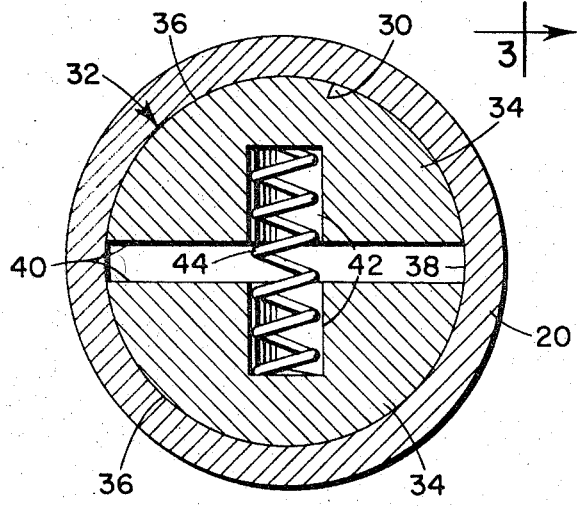
FIG. 3 is a cross-sectional view taken along line 3—3 of FIG. 2.

Damper 32 comprises a pair of elongated elements 34. Elements 34 are essentially identical and are substantially hemi-cylindrical in configuration as can be seen best viewing FIG. 3. The elements 34 are disposed in opposed relationship on opposite sides of the axis of rotation of shaft 20.

Each element has an outer arcuate surface 36 which is configured to conform to the shape of inner cylindrical surface 38 of bore 30. Also, each element 34 is provided with a substantially planar central surface 40. The elements 34 are disposed within bore 30 with surfaces 36 facing inner surface 38 of bore 30 and with central surfaces 40 disposed in spaced, facing, opposed, parallel relationship.

Figure 2:
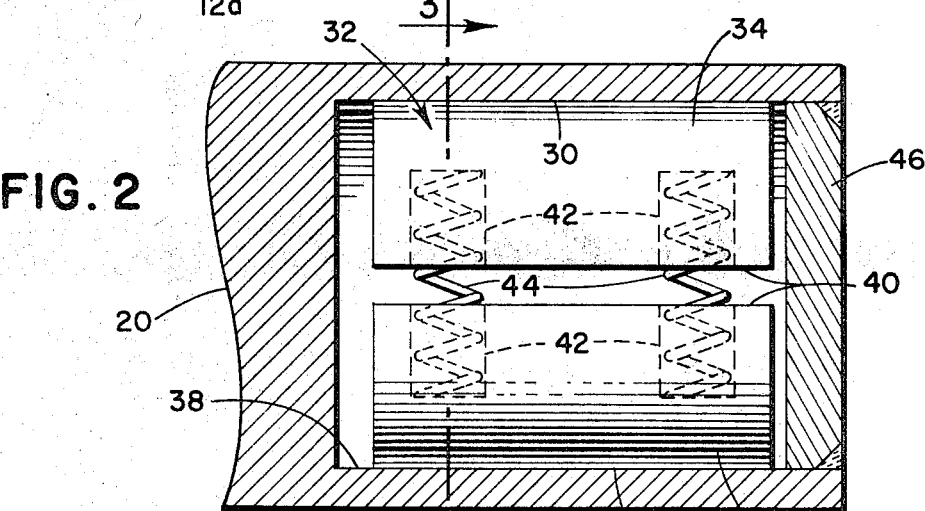
FIG. 2 is an enlarged, cross-sectional, fragmentary view of the end of the extruder screw illustrating the details of the damper.

A pair of counter-sunk holes 42 are provided in each element extending inwardly of the respective central surface 40. Holes 42 extend substantially normally relative to their corresponding surface 40 and each hole 42 is disposed in alignment with a hole 42 in the other element 34. An elongated coil spring 44 extends between respective aligned holes 42 as can be seen viewing FIGS. 2 and 3.

The springs 44 present yieldable means disposed between the central surface 40 urging elements 34 away from one another and urging outer surfaces 36 into tight frictional engagement with the inner surface 38 of bore 30.

A cover plate 46 is provided for closing the end of bore 30 to exclude the entrance of plastic material thereinto. This plate 46 is preferably welded to shaft 20 in view of the extremely high pressure of the plastic material adjacent die 28. Also, the material of construction of springs 44 should preferably be selected to resist the maximum operating temperatures experienced within barrel 22 adjacent die 28.

While the torsional vibration damper of the instant invention has been described in connection with an extruder screw, it will be apparent to those skilled in the art that the novel damper of this invention has utility in connection with any shaft wherein torsional vibrations are experienced.

Having thus described in detail a preferred apparatus which embodies the concepts and principles of the instant invention and which accomplishes the various objects, purposes and aims thereof, it is to be appreciated and will be apparent to those skilled in the art, that many physical changes could be made in the damper without altering the concepts and principles embodied therein. Hence, it is intended that the scope of the invention be limited only to the extent indicated in the appended claims.

What is claimed is:

1. Torsionally damped shaft driven apparatus comprising a shaft, means for driving one end portion of said shaft, means for loading the shaft at zones spaced from said driving means, a cylindrical bore in the end of the shaft remote from said driving means, a plurality of elongated hemicylindrical damping elements disposed in said bore, said elements having elongated arcuate surfaces at a radius substantially equal to that of the bore, said elements cooperating to provide substantially 360° contact with the bore surface, and means for biasing said elements radially outwardly to bring the elongated arcuate surfaces of said elements into initial frictional engagement with the surface of the bore along the length of said element surfaces, centrifugal forces acting on said elements augmenting said initial frictional engagement for dissipation of torsional vibration of the shaft relative to said driving means by frictional conversion of the torsional vibration energy of the shaft into heat.

2. The apparatus of claim 1, wherein said damping elements consist of a pair of said hemicylindrical elements.

3. The apparatus of claim 1, wherein said means for loading the shaft comprises an extruder screw on the shaft and extruder housing surrounding said screw.

4. The apparatus of claim 3, wherein an end plate is fastened to the free end of said shaft to seal said bore against entry of extruded material.

References Cited

UNITED STATES PATENTS 2,275,783   3/1942   Martellotti _____ 188—1(B-UX)
3,207,009   9/1965   Carlstedt _____ 74—574X M. CARY NELSON, Primary Examiner F. D. SHOEMAKER, Assistant Examiner U.S. Cl. X.R.

64—1; 188—1

PO-1050
(5/69)

UNITED STATES PATENT OFFICE
CERTIFICATE OF CORRECTION

Patent No. 3,555,927            Dated   January 19, 1971

Inventor(s)   WILLIAM F. PLUME

It is certified that error appears in the above-identified patent and that said Letters Patent are hereby corrected as shown below:

Column 3, line 32 - change "21.6" to -- 216. --. Column 3, li 33 - change "24.2" to -- 242. --.

Signed and sealed this 21st day of December 1971.

(SEAL)
Attest:

EDWARD M. FLETCHER, JR.      ROBERT GOTTSCHALK
Attesting Officer              Acting Commissioner of Pate